Feb. 28, 1956 E. JOYET 2,736,092
MACHINE FOR MINCING FOODSTUFF
Filed May 25, 1953

Inventor:
Edouard Joyet
by J. Delattre-Seguy
Attorney

United States Patent Office 2,736,092
Patented Feb. 28, 1956

2,736,092

MACHINE FOR MINCING FOODSTUFF

Edouard Joyet, Lausanne, Switzerland

Application May 25, 1953, Serial No. 357,094

2 Claims. (Cl. 30—307)

My invention has for its object a machine for mincing foodstuff, said machine including at least two circular knives revolubly carried inside a casing and having each a cutting periphery, the casing containing said knives forming the handle which serves for shifting the knives edgewise over the foodstuff to be minced.

I have illustrated by way of example in accompanying drawing a preferred embodiment of the machine forming the object of my invention. In said drawing.

Figure 1:
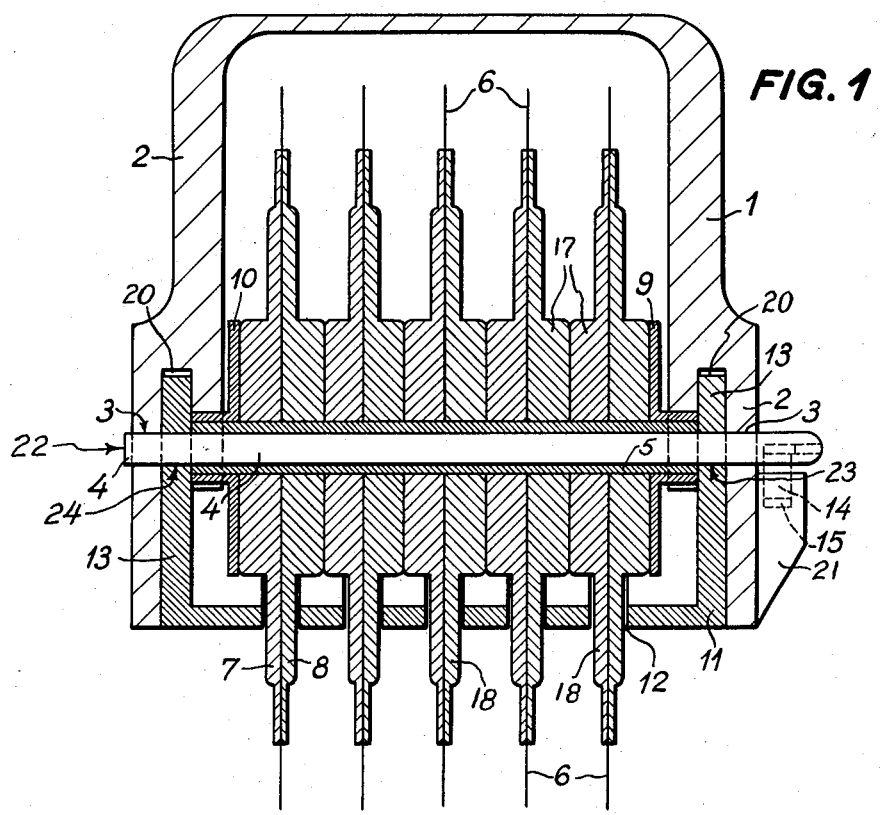
Fig. 1 is a cross-sectional view of the machine through line I—I of Fig. 2.
Figure 2:
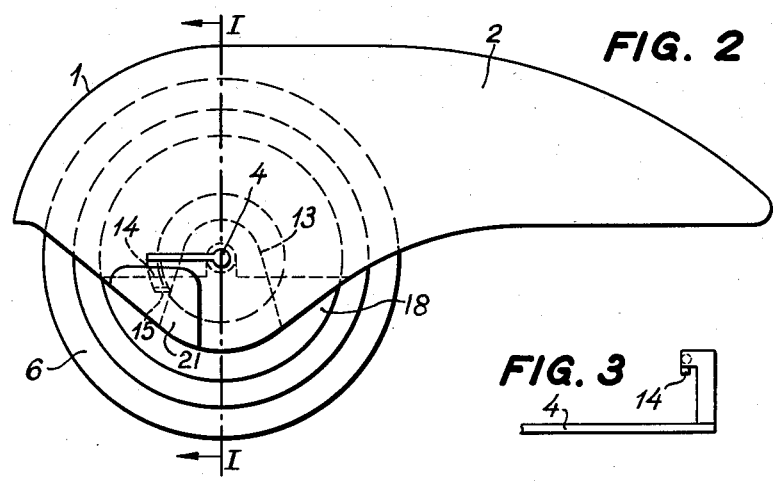
Fig. 2 is a side view thereof.
Figure 3:
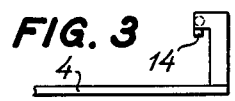
Fig. 3 illustrates a detail feature of the machine.

The machine illustrated includes a casing 1 the side walls 2 of which are provided with alined ports 3 inside which is carried a spindle 4; on the latter is revolubly mounted a plurality of circular knives 6, the number of which is equal to five in the embodiment disclosed. Each of said knives, the periphery of which comprises a cutting edge, is held fast between two metal discs 7 and 8. Each of the discs 7 and 8 comprises a thick central portion 17 for spacing purpose of the knives, and an annular peripheral thinner portion 18. The associated knives 6 and discs 7 and 8 are fitted on a sleeve 5 by means of two flanges 9 and 10 that are mounted over the sleeve with a tight fit, said sleeve being revolubly mounted on the spindle 4.

The casing 1 includes a lower cover 11 provided with parallel slots 12 arranged for the passage therethrough of the peripheral thinner portions 18 of the corresponding stiffening discs 7 and 8 with a very small clearance. The lower cover 11 has two opposite side lugs 13 provided with perforations for the passage of the spindle 4 and unilaterally fitted in corresponding recesses 20 in the inner surfaces of the side walls 2. The spindle is held fast by one of its ends which is bent so as to form a bolt 14 adapted to engage a corresponding clamping recess 15, provided in an outer embossing 21 of the corresponding side wall 2 of the casing 1.

The spindle is slidingly introduced by its straight end 22 into the part 3 of the side wall 2 which bears the embossing 21, passes through the perforation 23 of the corresponding side lug 13 of the lower cover, and coaxially through the sleeve 5 until it protrudes from the part 3 of the opposite side wall 2 after having passed through the perforation 24 of the corresponding side lug 13 of the lower cover. The opposed end of the spindle 4, being bent so as to form a bolt 14, is stopping the progression of the spindle 4 by abutment of the bolt 14 against one of the side walls 2 of the casing 1 when the straight end 22 of said spindle starts protruding from the part 3 of the opposed side wall of said casing. By a slight rotation around the axes of the spindle 4, said bolt 14 may be clamped in the clamping recess 15 provided in said embossing 21 of the corresponding side wall 2 of the casing, in order to maintain rigidly the spindle 4 in its operative position.

The machine illustrated operates as follows:

The user takes hold of the casing 1 and shifts it over the foodstuff while the knives 6 engaging the latter are constrained to revolve and to cut into the foodstuff.

What I claim is:

1. In a device for mincing foodstuff, an elongated upwardly convex casing having substantially a constant width over its length, the shape of said casing being adapted to constitute a handle for reciprocating the device, said casing having a lower opening and comprising two opposite walls provided with alined bearings located in recesses provided on the inside of said opposite walls, a spindle slidably mounted in said bearings, a sleeve revolubly fitted on said spindle between said alined bearings, a row of coaxial holding and spacing discs and a row of circular coaxial knives tightly fitted on said sleeve, whereby each circular knife is clamped between two adjacent stiffening discs which comprise a thick central portion for spacing purpose and an annular peripheral thinner portion, a lower cover adapted to close said lower opening and formed with parallel slots arranged for the passage therethrough of said peripheral thinner portions of the corresponding stiffening discs with a small clearance, said cover having two upstanding opposite side walls provided with alined perforations for the passage of said spindle therethrough, said side walls being partly inserted in said recesses provided in the inside of each of said opposite walls of the casing, each of said perforations of the cover side wall being located between the adjacent bearing in the casing and the corresponding end of said sleeve, whereby, upon sliding and removal of said spindle, the lower cover as one unit and the rows of stiffening discs in unison with the row of said circular knives fitted on said sleeve, as a second unit, can immediately be removed from the casing through the lower opening thereof.

2. In a device for mincing foodstuff, an elongated upwardly convex casing the outer side of which constitutes a handle for reciprocating the device, said casing having a lower opening and comprising two opposite walls provided with alined bearings and inside recesses, one of said casing walls having an outer embossing formed with a clamping recess, a spindle slidable in said bearings with one of its ends protruding from said casing, a bent bolt carried by said protruding part of the spindle the outer end of which is clamped in said clamping recess for a given angular position of said spindle, a sleeve revolubly fitted on said spindle between said alined bearings, a row of coaxial holding, stiffening and spacing discs with a thick central portion and an annular peripheral thinner portion and a row of circular coaxial knives tightly fitted on said sleeve, each circular knife being clamped between two adjacent discs, a lower cover adapted to close said lower opening and having a substantially cylindrical bottom wall coaxial with said spindle, said cylindrical bottom wall being formed with parallel slots arranged for the passage therethrough of said peripheral thinner portions of the corresponding stiffening discs with a very small clearance, said cover having two opposite upstanding side lugs provided with alined perforations for the passage of said spindle therethrough, said lugs being unilaterally fitted in said recesses inside the opposite walls of the casing, two annular flanged members fastened onto the respective end portions of said sleeve beyond said row of holding discs between the same and the inner side of the corresponding lug, each of said lugs being thus located between the adjacent bearing in the casing and the corresponding end of the sleeve, whereby, upon rotation of said spindle out of said given angular position for freeing said bent bolt from said clamping recess and after removal of said spindle by sliding, the lower cover as a first unit, and the rows of stiffening discs and of the knives in unison with said sleeve and annular flanged members as a second unit, can be immediately removed from the casing.

References Cited in the file of this patent

UNITED STATES PATENTS

| | | |
|---|---|---|
| D. 148,005 | Aleks | Dec. 2, 1947 |
| 965,477 | Miller | July 26, 1910 |
| 2,275,884 | Barker | Mar. 10, 1942 |